United States Patent [19]
Boyken et al.

[11] Patent Number: 6,124,862
[45] Date of Patent: Sep. 26, 2000

[54] METHOD AND APPARATUS FOR GENERATING VIRTUAL VIEWS OF SPORTING EVENTS

[75] Inventors: Jeffery D. Boyken, Meridianville; Brian K. Mitchell; Robert V. Wells, both of Huntsville, all of Ala.

[73] Assignee: AniVision, Inc., Huntsville, Ala.

[21] Appl. No.: 09/094,524

[22] Filed: Jun. 12, 1998

Related U.S. Application Data

[60] Provisional application No. 60/049,971, Jun. 13, 1997.

[51] Int. Cl.$^7$ .................................................. G06T 17/00
[52] U.S. Cl. .......................................... 345/435; 345/433
[58] Field of Search ................................... 345/418, 419, 345/427, 425, 428, 429, 430, 433, 435

[56] References Cited

U.S. PATENT DOCUMENTS

| | | | |
|---|---|---|---|
| 3,217,098 | 11/1965 | Oswald | 178/6 |
| 4,754,342 | 6/1988 | Duffy | 360/14.3 |
| 5,363,297 | 11/1994 | Larson et al. | 364/410 |
| 5,499,146 | 3/1996 | Donahue et al. | 360/33.1 |
| 5,513,854 | 5/1996 | Daver | 273/454 |
| 5,564,698 | 10/1996 | Honey et al. | 273/128 |
| 5,598,208 | 1/1997 | McClintock | 348/159 |
| 5,600,368 | 2/1997 | Matthews, III | 348/143 |
| 5,734,805 | 3/1998 | Isensee et al. | 395/119 |
| 5,737,525 | 4/1998 | Picazo, Jr. et al. | 395/200.02 |

OTHER PUBLICATIONS

Machine Vision Theory Algorithms Practicalities 2nd Edition E.R. Davies.

*Primary Examiner*—Phu K. Nguyen
*Assistant Examiner*—Cliff N. Vo
*Attorney, Agent, or Firm*—Sirote & Permutt; Russell Carter Gache'

[57] ABSTRACT

A virtual view system uses raw imagery from cameras placed around a sporting arena to generate virtual views of the sporting event from any contemplated view point. The system consists of an optical tracking system, a virtual environment server, and one or more virtual view stations. The optical tracking system receives raw, 2-dimensional video data from a pre-selected number of cameras strategically placed around a sporting arena. The raw 2-dimensional data is then compartmentalized into data gates and processed via a series of software image processors into body state data assigned to each sports player or other targeted entity. The body state data is then passed to a virtual environmental server which generates body position information and visual models for transfer to a selected number of virtual view stations. Each virtual view station includes viewing software for rendering and viewing a virtual sports scene as desired. The view stations also control the viewing point of view of a virtual camera and output video data to a video production center so that video data may be transmitted and combined with other video output as needed. The system permits an operator to select a desired virtual view from the optional control center and transmit the virtual view images to a remote audience. Optional subsystems such as a control center and an archive computer may be integrated into the system to alter camera positioning, tether, focus, and zoom, and to store processed data for the sporting event and replay the data on demand.

20 Claims, 7 Drawing Sheets

METHOD AND APPARATUS FOR GENERATING VIRTUAL VIEWS OF SPORTING EVENTS

This application claims the benefit of filing priority under 37 C.F.R. §1.78 of the copending U.S. Provisional Application Ser. No. 60/049,971, filed Jun. 13, 1997, for a Method and Apparatus for Generating Virtual Views of Sporting Events.

FIELD OF THE INVENTION

The present invention relates generally to three-dimensional computer graphics display systems, and pertains specifically to systems and methods that allow viewers and broadcasters to view a sporting event from virtually any vantage point.

BACKGROUND OF THE INVENTION

It is well known in the art to broadcast a sporting event by positioning a plurality of television cameras at suitable locations, providing feeds from those cameras to announcers in a broadcast booth, replaying certain plays from the event so that the announcers might make a comment about those plays, and finally transmitting the entire telecast to the viewing audience. However, this conventional broadcasting approach suffers from several shortcomings.

First, the quality of the broadcast suffers if the cameras are not wisely positioned relative to the playing field or if there are simply too few cameras to cover the field adequately. Thereby causing certain plays in certain parts of the field to be missed or inadequately covered.

Second, although some conventional television cameras are somewhat mobile, the placement of the cameras around the playing field is essentially fixed and static. However, the movement of the game ball and players on the field is dynamic and unpredictable. Thus, during a game, the statically-placed cameras often fail to provide a view from a critical angle, or the cameras' views are obstructed by player or officials. For example, stationary field cameras routinely fail to provide close-up views of baseball runners sliding into bases to avoid tags, of running backs fumbling before or after their knees touch the ground, or of wide receivers attempting to place both feet in bounds after catching a pass.

Third, conventional cameras generally are not placed within the actual playing field during games. Auto racing is one notable exception; in-car cameras have revolutionized racing broadcasts and have sparked fan interest in the sport. However, for other sporting events, such as football, on-field cameras mounted in helmets or other sporting equipment do not yet enjoy wide spread use. Thus, remote field cameras must record the action from relatively distant vantage points with indirect views.

Fourth, the color commentators in the broadcast booth must make do with the video prerecorded by the field cameras, whether or not video is useful. The commentators cannot reposition the cameras dynamically to record the action from another viewpoint. Thus, the commentators are restricted to static video images and cannot alter the viewpoints from which the video is recorded. Also, with the increased use of instant-replay officiating by major professional sports leagues, the vantage points of instant replays are becoming more and more critical.

Some attempts have been made previously to provide real time acquisition and processing of the physical positions of sports players and targeted sporting equipment, such as playing balls. For example, Daver, U.S. Pat. No. 5,513,854, discloses a system for real time acquisition of persons in motion, and Larsen, U.S. Pat. No. 5,363,297, discloses an automated camera tracking system for sporting events. However, neither of these systems teaches a single system for tracking individual sports players and sporting equipment in real time, using the tracking data to generate simulated images based upon processed values, and integrating the simulated figures into a virtual sporting environment which is updated in real time to represent the original sporting event.

Therefore, the deficiencies in the sporting industry and failures in prior systems to solve the need for generating virtual views of sporting events motivated the instant invention.

SUMMARY OF THE INVENTION

It is the object of the present invention to provide a system and method for real-time collection of human activities, such as a sporting event, for infinite viewpoint presentations and analysis, regardless of static camera placement.

Another object is to provide a system and method for furnishing views of a given sporting play from the optimum angle and viewpoint, regardless of static camera placement or dynamic movement of the game equipment, players, or officials.

Yet another object is to provide a system and method that allow announcers and viewers to see on-field action from the perspective of an on-field camera position and that allow thus users to select virtually any on-field camera position.

A further object is to allow color commentators to adjust the viewpoints of the video to suit their specific poses.

In summary, the virtual view system uses raw imagery from cameras placed around a sporting arena to generate virtual views of the sporting event from any contemplated view point. The system consists of an optical tracking system, a virtual environment server, and one or more virtual view stations. The optical tracking system receives raw, 2-dimensional video data from a pre-selected number of cameras strategically placed around a sporting arena. The raw 2-dimensional data is compartmentalized into data gates and processed via a series of software image processors into body state data for each sports player or other targeted entity. The body state data is then passed to a virtual environmental server which generates body position information and visual models for transfer to a selected number of virtual view stations. Each virtual view station includes viewing software for rendering and viewing a virtual sports scene. The view stations also control the viewing point of view of a virtual camera and output video data to video production center so that video data may be transmitted and combined with other video output as needed. The system allows an operator to select a desired virtual view from an optional control center and transmit the virtual view to a remote audience. Optional subsystems such as a control center and an archive computer may be integrated into the system to alter camera positioning, tether, focus, and zoom, and to store processed data for the sporting event and replay the data on demand. The virtual view generated may or may not have an actual counterpart in the raw video received from the arena cameras, but would accurately represent the actual playing situation based upon calculated data.

Other features and objects and advantages of the present invention will become apparent from a reading of the following description as well as a study of the appended drawings.

BRIEF DESCRIPTION OF THE DRAWINGS

A virtual viewing system incorporating the features of the invention is depicted in the attached drawings which form a portion of the disclosure and wherein.

DESCRIPTION OF THE PREFERRED EMBODIMENT

Figure 1:
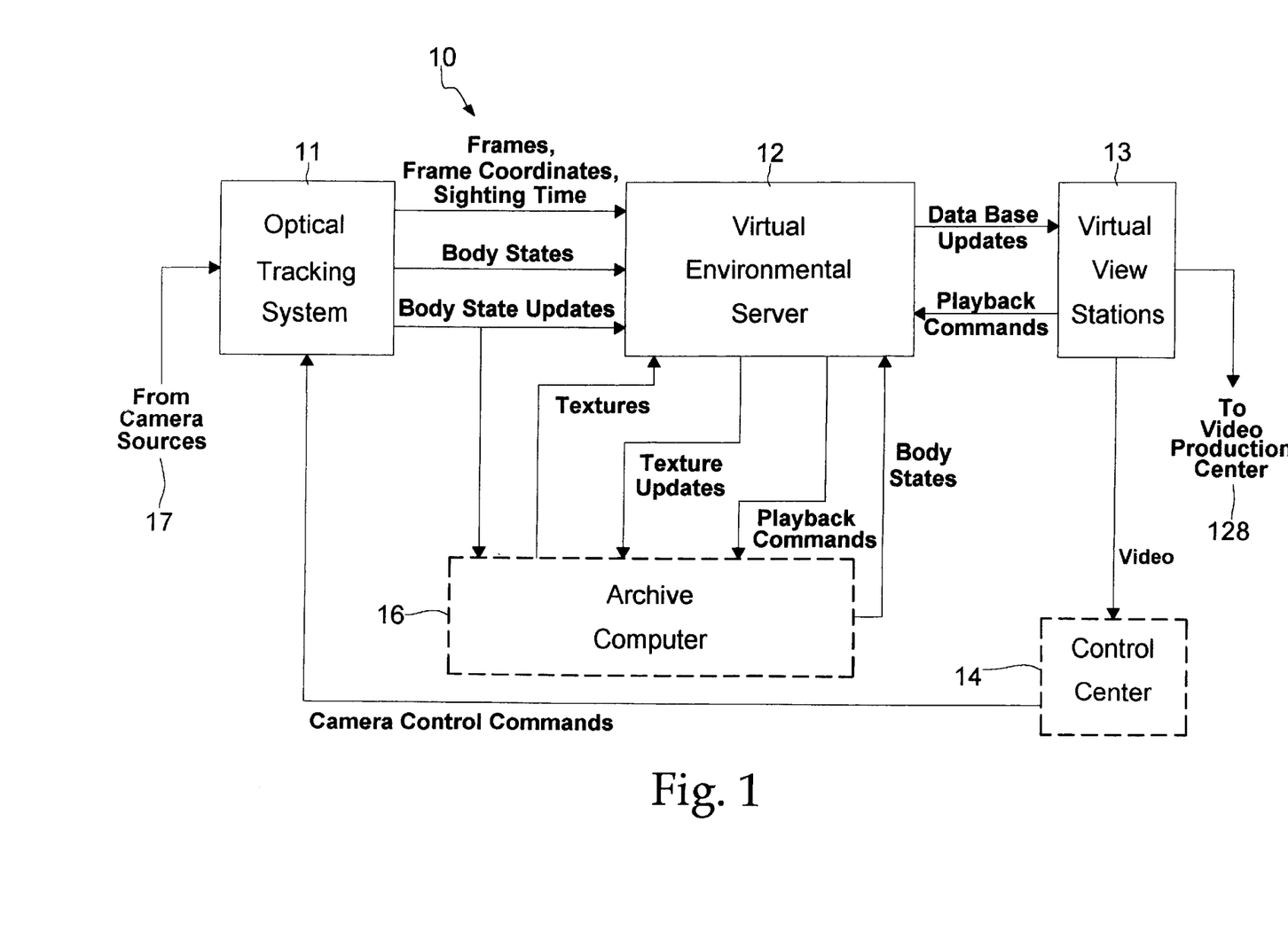
FIG. 1 is an overall system diagram showing the major system components.

Referring to the drawings for a better understanding of the function and structure of the invention, the instant invention, called the Virtual View Sports System 10 (VVS System), comprises three major subsystems: the Optical Tracking System 11, the Virtual Environment Server 12, and Virtual View Stations 13. A Control Center 14 and an Archive computer 16 are optional subsystems which enhance the capability of the VVS system, but are not critical for system operation. The overall system architecture of the VVS System 10 showing these major subsystems is shown in FIG. 1. Additional drawings of proposed system hardware components and a system-wide diagram may be found in the instant copending provisional application, hereby incorporated by reference, and which may be helpful to the reader during the discussion that follows.

For purposes of illustration, the present invention will be described with reference to the virtualization of a sporting event having sports players and a ball. However, it will be understood to those skilled in the art that the VVS System 10 may be applied to any type of situation in which preselected objects need tracking and conversion into a virtual environment, such as military maneuvers, hazardous environment monitoring, and unmanned space exploration, etc.

Figure 2:
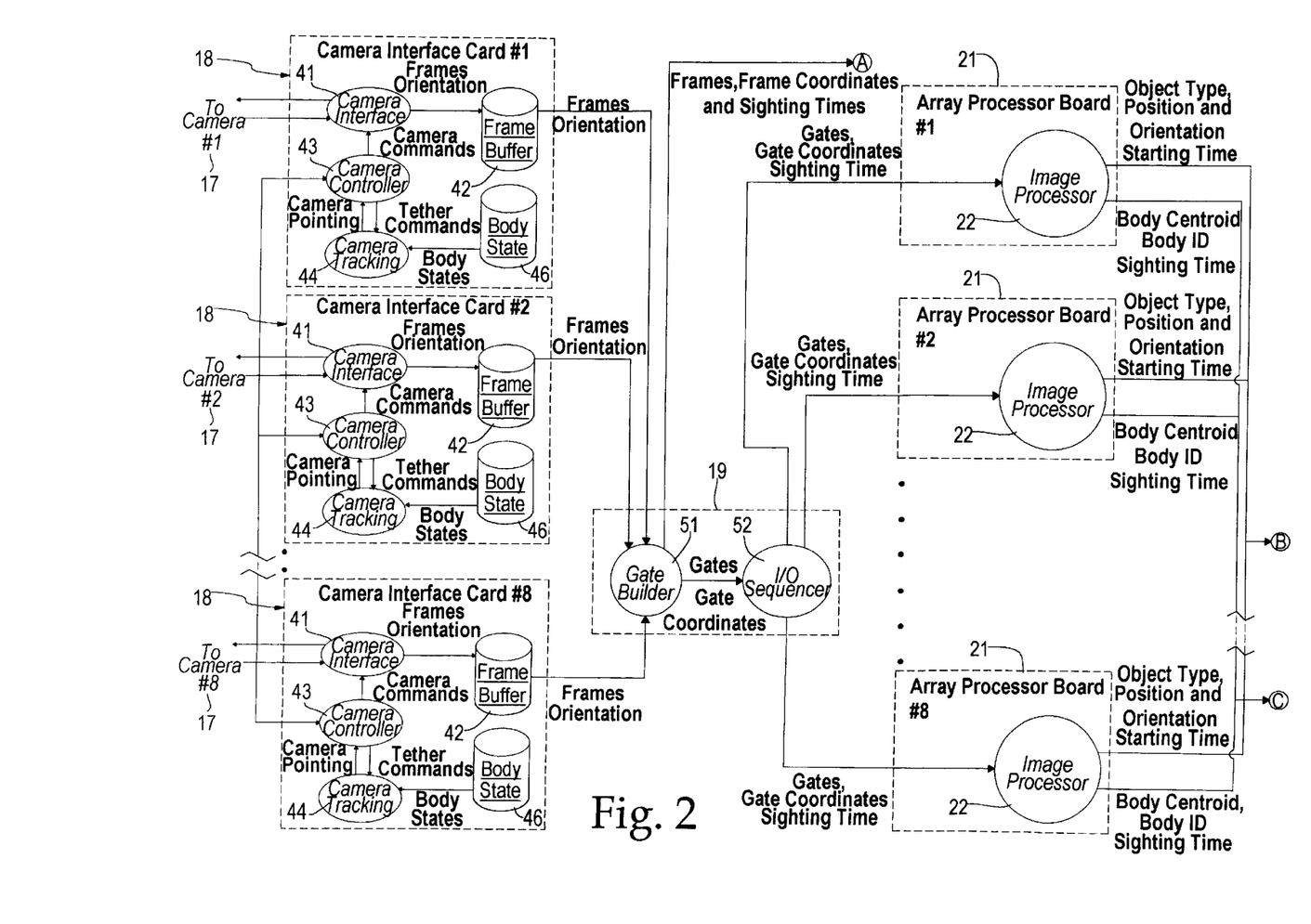
FIG. 2 is a combined system and data flow diagram of the Camera Interface Cards, the I/O Sequencing Module, and the Array Processor boards within the Optical Tracking System.

Referring to FIG. 2, the Optical Tracking System 11 receives raw video data from a set of conventional TV cameras 17 strategically positioned around a sporting arena to generate three-dimensional (3-D) positional data based on what each camera sees in two-dimensions (2-D). Two or more cameras should be used depending on the application and the amount of accuracy required and, in addition, high-resolution cameras may be incorporated if extreme accuracy is required. The raw 2-dimensional data is compartmentalized into data gates by an I/O Sequencer subsection 19 and processed via a series of Array Processor Boards 21 into body state data 67 for each sports player or other targeted entities within each received video image. A Track Correlation Board 23 is also included in the Optical Tracking System 11 (see FIG. 3).

Figure 5:
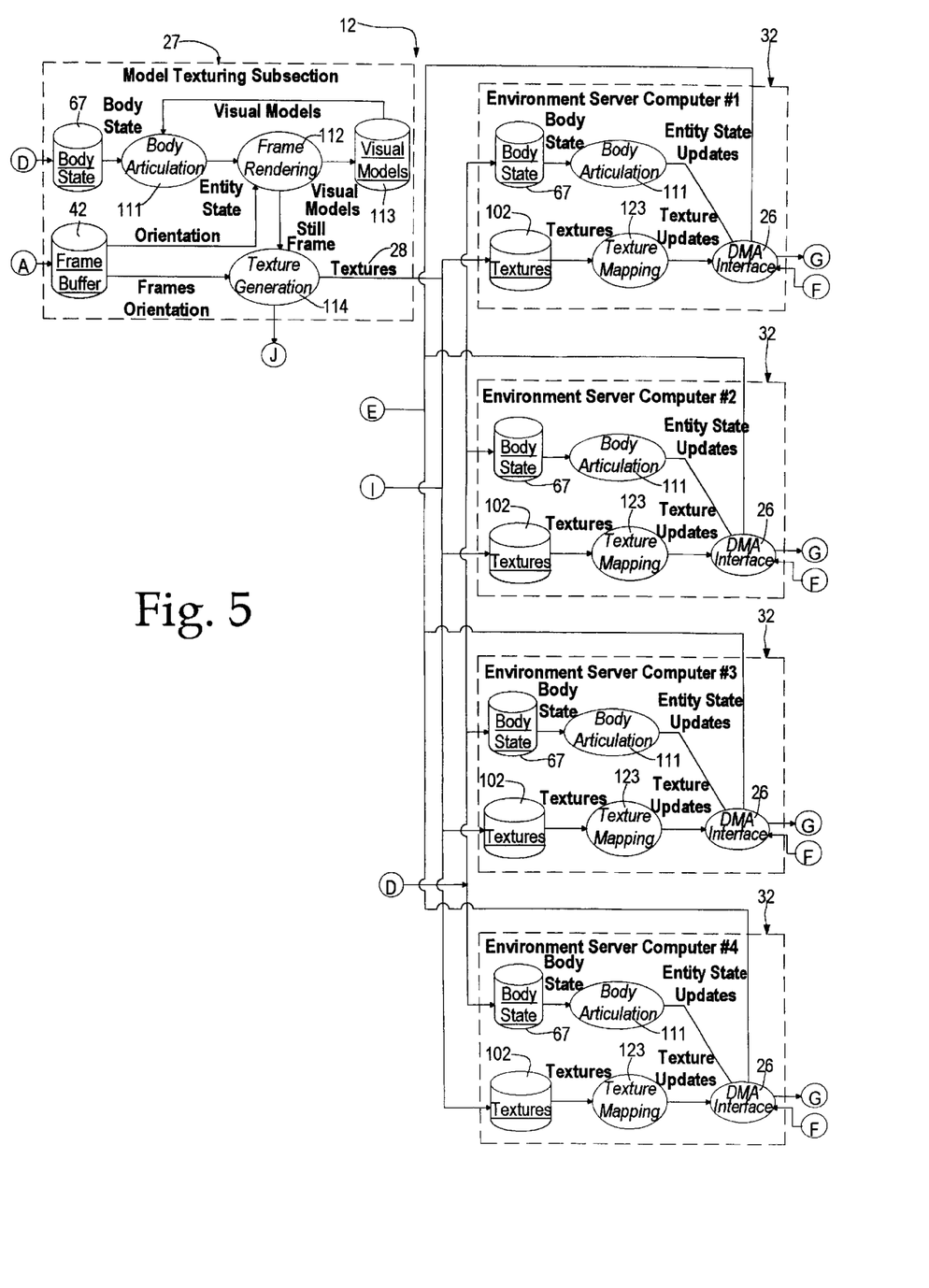
FIG. 5 is a combined system and data flow diagram of the virtual environmental server having sub-components of the Model Texturing Board and The Environmental Server Computers.

As shown in FIG. 5, the data is then received by the Virtual Environment Server 12 which generates realistic, animated characters from positional data and video frames. The Server 12 includes a Model Texturing Board 27 and a series of Environment Server Computers 32 to overlay actual video data onto the sports characters that produces very lifelike appearance. The Virtual Environment Server 12 may also optionally archive historical recordings in an Archive Computer 16 (see FIG. 7) so that the Virtual View Stations 13 may regenerate a stored image at the request of an operator.

Figure 3:
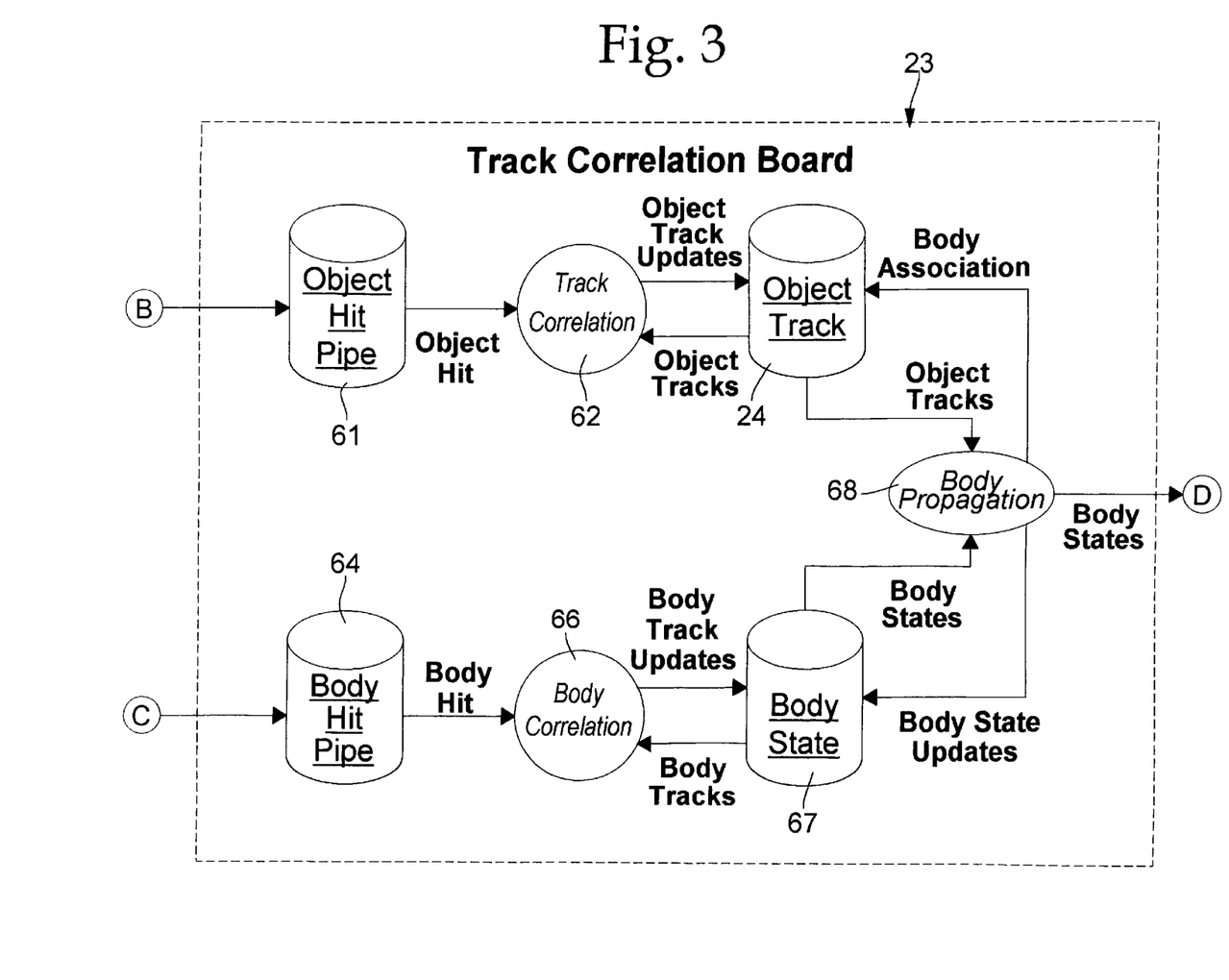
FIG. 3 is a combined system and data flow diagram of the Track Correlation Subsection within the Optical Tracking System.

The Environment Server Computer 32 uses preprogrammed knowledge of body movement to correct and improve the body states estimated by the Track Correlation system 23 (see FIG. 3). The measured body states can be altered by recognizing certain gestures, such as a player running, and smoothing the state to present a more realistic visual simulation. Body smoothing further reduces motion jerkiness and compensates for any missing measurements.

Another technique to provide better body states is to model the physics of motion for a body and its interaction with other bodies. For instance, most tracking filters would have difficulty following a baseball as a bat struck it. Predicting this interaction and measuring the influencing forces for the bodies can be used to alter the system's state equations resulting in superior body state information.

Figure 6:
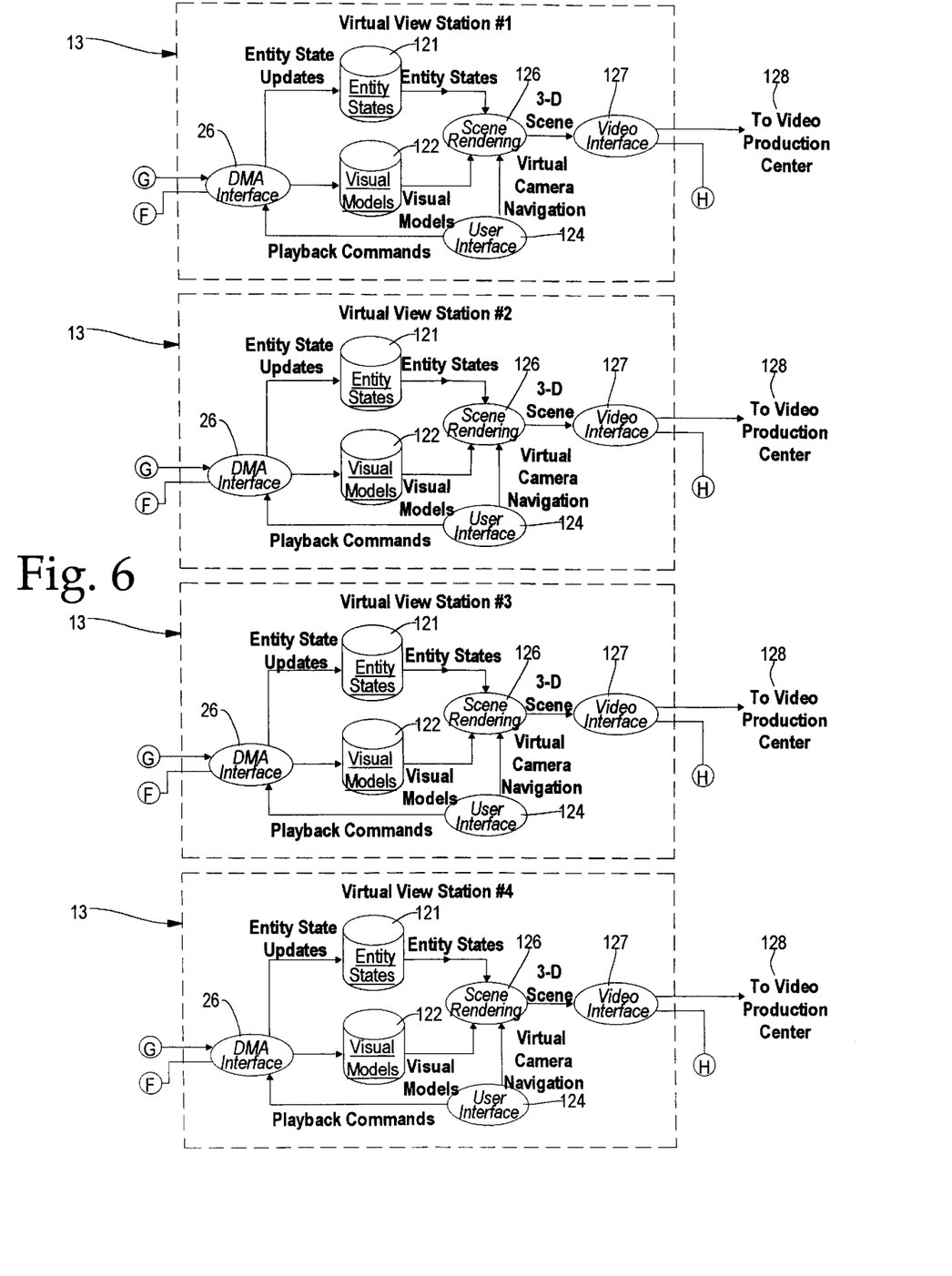
FIG. 6 is a combined system and data flow diagram of the Virtual View Stations.

At least one Virtual View Station 13 is required for the VVS System to operate, however a scaleable system is preferable in which multiple View Stations are utilized as shown in FIG. 6. Each station is essentially a virtual camera operated by a camera operator. Each Virtual View Station can render a 3-D view based on character animations and positional data provided by the Virtual Environment Server 12. The camera operator could use a joystick on an interface console or select from pre-selected viewpoints generated by an operator at the Control Center 14 to move his viewing perspective and to "fly" to any location, thus allowing sporting events to be viewed from any virtual perspective. The operator controls the virtual perspective through standard imaging software running on each Virtual View Station 13.

The Control Center 14 allows an operator to tailor the operation of the VVS System 10 on demand if manual intervention is desired. The Control Center 14 adds the capability to initialize, diagnose and fine-tune the VVS System 10. In addition, from the Control Center 14 an operator can remotely steer each camera attached to the VVS System 10 to provide optimal coverage of points of interest in the sporting event.

Referring again to FIG. 2, the Optical Tracking System 11 is contemplated to be a rack mountable electronics device optimized for converting optical camera data into three-dimensional positional data for objects viewed by the cameras 17. This three-dimensional data is called an "object track," and is updated continuously to correspond with sports figures' movements and relative ball position. The Optical Tracking System utilizes Commercial Off The Shelf (COTS) electronic components that can be easily designed to be held within a rack mountable card cage hosting dual 300 W AC power supplies, cooling fans, a 20 slot back plane and a number of plug-in cards. A bus expansion card can be included to provide high-speed connectivity between the Optical Tracking System 11 other VVS System components such as the Virtual Environment Server 12. A rack mountable configuration also provides a path for expanding the VVS System to support larger configurations having pluralities of top level VVS System components.

A series of Camera Interface Cards 18 provides buffering of camera frame data until the Optical Tracking System 11 is prepared to process it. The Cards 18 also provide connectivity back to the cameras for view, focus and zoom control, and act as a transmission conduit for the Control Center 14. Each Camera Interface Card includes a digital video interface and a control interface for a single camera. Eight Camera Interface Cards 18 are configurable to support cameras with resolutions up to 1280×1024 pixels with frame rates up to 60 Hz. The Optical Tracking System is initially designed to support up to 8 Camera Interface Cards. As shown, however, this is a scaleable system that can tailored to suit various types of sporting events which may require many more camera input sources.

An I/O Sequencer Subsection 19 receives buffered frame data from the Camera Interface Cards 18, and divides the frames into gates, and distributes this data to an appropriate Image Array Processor 21. A gate is defined as a manageable portion of a frame sized according to the capabilities of the hardware utilized in the system and can vary according to dynamic system parameters. The system typically will use a single I/O Sequencer 19 for every eight Camera Interface Cards 18 and a corresponding eight Image Array Processors Boards 21 as shown.

The Image Array Processor Boards 21 provide image processing on gates provided by the I/O Sequencer 19. Each Image Array Processor Board hosts a Single Instruction Multiple Data Stream Architecture (SIMD)-type array of high-speed image processors 22. These image processors 22 identify objects in each frame using industry standard image processing algorithms. Two-dimensional position data for each object relative to the frame is then passed to the Track Correlation Board 23.

As shown in FIG. 3, the Track Correlation Board 23 processes object position data from each of the Image Array Processor Boards 21 and correlates each object position data with historical 3-D object position data, known as object track files 24, that are stored in memory. A shared memory area having sufficient amounts of standard random access memory to store data generated by the individual subsections of the VVS 10 is accessible through a common DMA interface 26 connected to all the VVS System subsections through common electronic subsystem buses.

Referring now to FIG. 5, the Virtual Environment Server 12 is similar to the Optical Tracking System in that the system components are susceptible to being designed with COTS electronics and will normally be held in a rack mountable device optimized for creating, maintaining, and distributing a representation of a live sporting event. A COTS bus expansion card may be included to provide high-speed connectivity between the Virtual Environment Server 12 and the Optical Tracking System 11 through the DMA interface.

The Model Texturing Subsection 27 generates photo-realistic 3-D visual models based on information provided by the Optical Tracking System 11. The Model Texturing Subsection 27 accesses information from the shared databases holding position measurements for each of the body parts of a sports figure and from which it generates a 3-D wire-frame representation of the sporting participant. The Subsection 27 then utilizes video frame data to generate "model textures" 28 for each body part and maps these textures onto the wire-frame model held by the Tracking Subsection 27, as previously generated, to create a highly realistic 3-D visual model.

The Environment Server Computers 32 use body state information previously calculated by the Track Correlation Board 23 and texture information 28 generated by the Model Texturing Subsection 27 to provide coherent body position information and visual models to the Virtual View Stations 13 for scene generation. Body position data and real-time visual models are synchronized with the Virtual View Stations 13 through the Direct Memory Access (DMA) interface 26. The Virtual Environmental Server 12 also accepts archive requests from the Virtual View Stations 13 through the DMA Interface.

As an optional enhancement, the Archive Computer 16 (See FIG. 8), can provide real-time recording and playback of body position information and visual models from an series of inexpensive Redundant Array of Drives (RAID) that provides fast redundant storage and retrieval of historical, virtual environment data on demand. The Archive Computer also may be configured to support user controlled playback speeds through proper VVS preprogramming.

Figure 8:
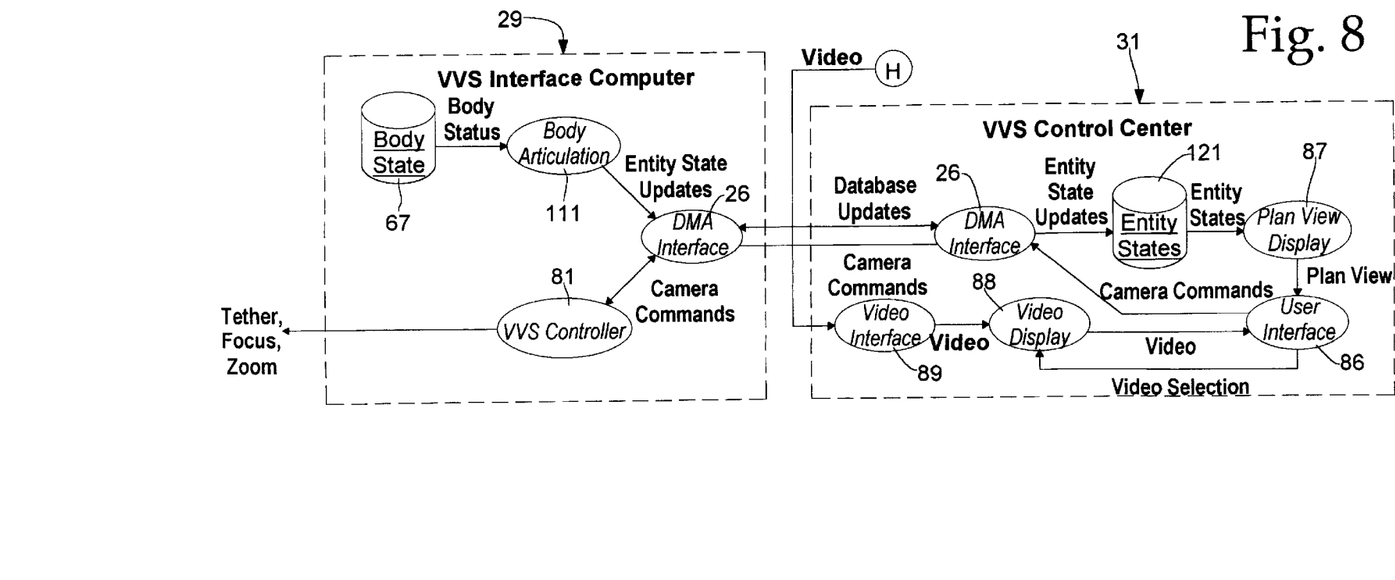
FIG. 8 is a combined system and data flow diagram of the Control Center having sub-components of the VVS Interface Computer and the VVS Control Center.

Referring now to FIG. 6, each Virtual View Station 13 are high-end COTS SGI Workstations hosting VVS Viewing Software. The Virtual View Stations 13 will allow an operator to control the viewing angle of a virtual camera, and monitor real-time data or work in instant replay mode for generating high quality scenes. Each Virtual View Station 13 includes a Scene Rendering function 126 which renders the 3D virtual environment by using body state information to determine the location of objects within the scene. In general, the Scene Rendering function 126 uses 3D polygonal databases and photo-realistic textures to represent the objects in the scene. Once the scene is rendered, the Scene Rending function 126 responds to interactive changes in viewpoint within the scene. This combination of photo-realistic models and representative body state data allows the Scene Rendering function to generate a highly realistic virtual scene for real-time interactive playback. In the instant embodiment, the VVS System is contemplated to support up to four virtual View Stations As seen in FIG. 8, another optional enhancement to the VVS System 10 is a Control Center 14 having a VVS Controller Interface Computer 29 and a VVS Control Center 31. The Controller Interface 29 serves as an interface between the VVS Control Center 31 and the Optical Tracking System 11/Virtual Environment Server 12. The VVS Controller Interface is capable of passing real-time object position data to the VVS Control Center through the Direct Memory Access (DMA) Interface 26. It also serves to transmit camera commands, such as pointing, zooming, and focusing, and also system commands, such as initializing and configuring, from the VVS Control Center through the DMA Interface 26.

The VVS Control Center 31 is a COTS Silicon Graphics (SGI) Workstation hosting VVS Control Software. The VVS Control Console (not shown) permits, through the Control Software, an operator to initialize the VVS System, optimize performance, perform upgrades and override automated controls of cameras. The VVS Control Console communicates with the Virtual Environment Server and the Optical Tracking System through the Direct Memory Access (DMA) Interface 26.

A further description of the data flow and processing functions of the VVS System 10 in operation will serve to illustrate the systems capabilities. A standard convention of italicizing element Function Names, bolding Data Names, and underlining Database Names, is used to clarify the relationships of various system functions and transference of date between functions. Reference should be made to the previously described figures showing the VVS System's major and minor subsystems as each subsection's operation is addressed.

As shown in the preferred embodiment, the Optical Tracking System supports up to 8 Camera Interface Cards 18. Each card has a Camera Interface 41, a Frame Buffer 42, a Camera Controller 43, a Camera Tracking function 44, and a shared Body States file 46. The Camera Interface 41 processes video Frames and Camera Orientation from the cameras 17 and stores it in the Frame Buffer 42. Interface 41 also processes Focus, Zoom and Pointing commands from the Camera Controller 43 and forwards them to a selected camera 17. The Camera Controller 43 processes camera commands such as Tether, Focus and Zoom from the VVS Controller 81 in the VVS Interface Computer 29. For example, a Tether command from the VVS Controller 81 causes the Camera Controller 43 to direct a camera to follow a particular sports body, and the Controller 43 also forwards Tether commands to the Camera Tracking function 44. Camera Pointing commands from the Camera Tracking function 44 are also handled by the Controller 43. The Camera Tracking function 44 processes Tether commands from the Camera Controller function 43 and has the capability to read a single instance of Body State Data from the shared Body States file 46 and calculates camera orientation changes required in order to center the tethered body in the selected camera's field of view. Camera Pointing commands are then sent to the Camera Controller function 43 for proper camera movement. The Body States file 46 is updated in real-time by the Body Propagation function 68 as will be discussed.

The I/O Sequence Subsection 19 consists of a Gate Builder 51 and an I/O Sequencer 52. The Gate Builder 51 polls the frame buffers 42 for Frame data and Camera Orientation. The Gate Builder divides the Frames up into array size Gates, specifies X and Y Gate Coordinates for each gate, tags the Sighting Time for each gate, and feeds the Gate, Gate Coordinates and Sighting Time to the I/O Sequencer 52. In addition, the Gate Builder 51 sends Frames, Frame Coordinates and Sighting Time to the Model Texturing Subsection Board 27 at user definable rates. The I/O Sequencer 52 sequences the Gates, Gate Coordinates and Sighting Time to available Array Processor Boards 21. The I/O Sequencer 52 also provides load balancing for the eight 8 Array Processor Boards as shown.

The Array Processor Boards 21 primarily perform image-processing functions. These boards contain an Image Processor 22 that performs edge detection on each received Frame to identify bodies and their Body Centroid, which is defined as the 3-D position of the center point of a body. The Processor 22 also performs pattern matching to associate a particular body with a player and identifies 2D (body component) Object Position, Object Type, Object Orientation and Object Sighting Time for storage in the Object Hit Pipe database 64. The Image Processor transfers Body Centroid, Body Identification and Body Sighting Time variables to the Body Hit Pipe 64 as shown (see also FIG. 3).

Figure 4:
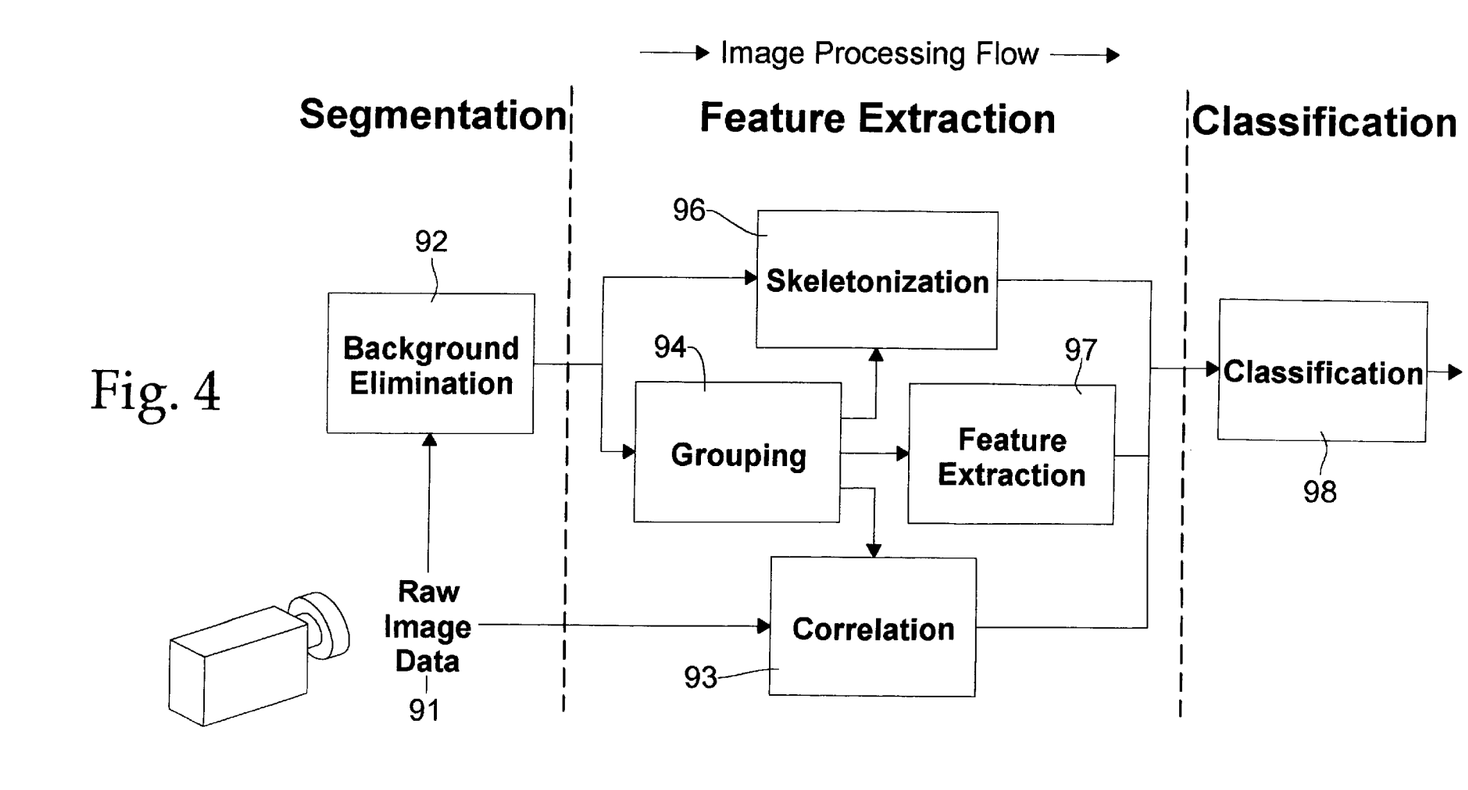
FIG. 4 is a data flow diagram of the image processing functions occurring within the image processor of the Optical Tracking System.

The aforementioned Image Processors 22 utilize standard image software processing techniques such as segmentation, Feature Extraction, and Classification to breakdown each body image in a Frame. FIG. 4 depicts one approach to resolving the body data using these techniques. As shown, raw image 91 data is transferred to program submodules for Background Elimination 92 and Correlation 93. The background Elimination sub-program 92 uses well known algorithms such as Binary Dilation, Binary Erosion, Binary Closing, Inverse Image Transforms, and Convex Hull techniques to separate background from true bodies. Image Grouping 94 occurs as part of the Feature Extraction portion of the extraction process and passes data to other sub-functions. The grouping subprocessing program 94 groups pixels using a spatial filter to create group IDs for each segmented pixel. This information is passed to the skeletonization subprogram 96, and the image correlation subprogram 93, and another feature extraction sub-program 97. The Skeletonization subprogram 96 identifies groups or blobs through pixel isolation techniques and systematically strips away of figure boundaries to form a unit-width skeleton. Image correlation 93 uses the previously created group IDs to assign the resulting correlation peaks in the skeletonization process to specific groups Other types of features extracted, such as area, moments, etc., also depend upon the data output from the grouping process, such as blob shape, and are processed by sub-program 97 to further refine body state data to obtain proper body measurements. Each resulting extracted group is then classified 98 according to pre-selected feature image templates and passed on to the Body 64 and Object Hit Pipes 61.

Various excellent books have been written on the subject of image processing using these techniques to identify moving sports figures and balls. One excellent source of such techniques is Digital Image Processing, by Kenneth R. Castleman, hereby incorporated by reference. Other references addressing techniques of blob and body devolution are listed in the reference table appended to the description and are also hereby incorporated by reference. Further discussion regarding frame image processing is omitted since it is beyond the scope of the invention and since standard industry processing techniques may be used in the instant invention for proper operation.

As seen in FIG. 3, the Track Correlation Board 23 formulates 3D object and body tracks based on 2D object and body state data from the Array Processor Boards 21. The Track Board 23 contains an Object Hit Pipe 61, a Track Correlation function 62, an Object Track file 24, a Body Hit Pipe 64, a Body Correlation function 66, a Body State file 67 and a Body Propagation function 68. The Object Hit Pipe 61 stores Object Hits such as Object Type, Object Position, Object Orientation and Object Sighting Time. The Track Correlation function 62 then correlates 2D Object Hits with 3-D Object Tracks stored in the Object Track file 24, updates the 3-D Object Position and Object Orientation, and calculates the Object Velocity and Object Acceleration. The Track Correlation function 62 also merges and splits Object Tracks stored in the Object Track file 24 as preselected correlation thresholds are met. The Object Track file 24 also stores Object Tracks, such as Object Type, Object Position, Object Orientation, Object Velocity, Object Acceleration and Parent Body. The Body Hit Pipe 64 stores body Hits such as Body Centroid, Body Identification and Body Sighting Time. Similarly, the Track Correlation function 62 processes Body Centroid and Body Identification information from the Body Hit Pipe 64 and updates Body Identification and Body Centroid data stored in the Body State file 67. The Body State file 67 stores Body States including Body Identification, Body Centroid, and state data for each articulated part. Each Body includes articulated parts data such as two feet, two knees, two torso points, one abdomen, two shoulder points, two elbows, two hands, and one head. For each articulated part, the Articulated Part Type, Articulated Part Position, Articulated Part Orientation, Articulated Part Velocity and Articulated Part Acceleration is stored. The Body State file 67 is stored in shared memory previously discussed for use by several other VVS boards and subsections including the Model Texturing Subsection 27 and the Environment Server Computers 12. The Body Propagation function 68 maintains the Body State file by correlating 3-D Objects Tracks with Articulated Parts in the Body State file 67, and updates the Parent Body variable in the Object Track file 24 and updates Articulated Part Position, Articulated Part Orientation, Articulated Part Velocity and Articulated Part Acceleration in the Body State File 67. The Body Propagation function 68 also applies human movement algorithms to smooth body articulations held in the Body State file 67. Body State updates are also sent to the Real-Time Recorder 101 for archiving by The Body Propagation function 68, assuming an Archiving Computer 16 is present in the system.

The Model Texturing Subsection 27 is responsible for real-time generation of model Textures from video Frames. The Subsection 27 utilizes the Body State file 67 and the Frame Buffer 42, and includes other elements such as a Body Articulation function 111, a Frame Rendering function 112, a Visual Models database 113, and a Texture Generation function 114. The Frame Buffer file 42 stores time tagged Frames of image and Camera Orientation data from the Gate Builder function 51. The Body Articulation function 111 uses Body State data to determine which Visual Model, which is a 3-D wire-frame and texture representation of a body, to associate with the body. The Visual Models file stores Visual Models including Model Name, Model Type, Entity Type Mapping, Body Dimensions, Polygonal Geometry, Textures and Texture Mapping. In sequence, the function 111 uses Body State data to generate Entity State data with articulated parts and transfers the data to the Frame Rendering function 112. The Frame Rendering function 112 then processes Entity State data from the Body Articulation function 111, Camera Orientation data from the Gate Builder function 51, and the Visual Models data from the Visual Models file 113 to render a Still Frame of the view from the camera 17. The Frame Rendering function 112 then sends the Still Frame to the Texture Generation function 114 to determine which polygons are in view and match the partitioned Frame from the Frame Buffer with the polygons in view and determine if the image quality is sufficient for texture generation. If image quality is sufficient, Texture and Polygon Mapping is generated and sent to the shared Textures file 102 and the Real-Time Recorder 101. The Texture Generation function processes a Still Frame from the Frame Rendering function and the associated Frame from the Frame Buffer. The Texture Generation function then takes the Still Frame and determines which polygons are in view, and takes the Frame from the Frame Buffer and partitions it to match the visible polygons. It also serves to determine if image quality is sufficient for texture generation.

Figure 7:
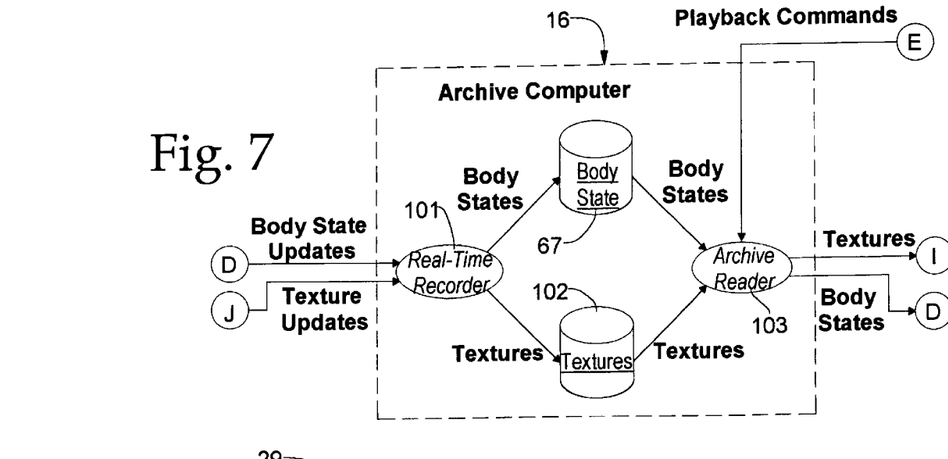
FIG. 7 is a combined system and data flow diagram of the Archive Computer.

The Archive Computer 16 has the capability of storing and retrieving Body States and Textures on demand. The Computer 16 includes a Real-Time Recorder function 101, interfaces to the Body State file 67, a Textures file 102, and an Archive Reader function 103. The Real-Time Recorder function 101 processes Body State updates from the Body Propagation function 68 in the Track Correlation board 23 and Texture updates from the Texture Generation function 114 in the Model Texturing Board 27. The Archive Computer 16 can record Body State updates in the Body State file 67 and updates in the Texture file 102 in real time. The Body State file 67 stores historical Body States and historical Texture updates. The Archive Reader function 103 responds to playback commands from individual Virtual View Stations 13. Playback commands include Set Start, Set End, Set Playback speed, Set Play Direction, Play, Pause, Step Frame, Go Start and Go End. The Archive Reader 103 has the capability to stream Body State updates and Texture updates to the Environment Server Computer 12 for each corresponding Virtual View Station 13.

The Environment Server Computer 32 has a primary function of generating Entity States, which are single instances from the Entity States file 121 and Visual Models 122 for its associated Virtual View Station 13. The Server Computer 32 utilizes the Body State file 67, the Textures file 102, the Body Articulation function 111, a Texture Mapping function 123, and the DMA Interface 26 to properly generate virtual scene data. The Body State file 67 and Textures database 102 are accessed from shared memory, that may be either a real-time database generated by the Body Propagation function 68 and Texture Generation function 114 respectively, or a playback database generated by the Archive Reader function 103. The Body Articulation function 111 performs the same actions as the Body Articulation function 111 in the Model Texturing Board 27 and sends Entity State updates across the DMA Interface 26 to the Entity States file 121 stored in each Virtual View Station 13. The Texture Mapping function 123 takes Textures and Polygon Mapping from the Texture file 102 and sends Textures and Texture Mapping updates across the DMA Interface 26 to the Visual Models database 122 stored in each Virtual View Station 13. The DMA Interface 26 synchronizes database updates from the Body Articulation 111 from the Texture Mapping 123 functions as the Entity State and Visual Model databases are stored in each associated Virtual View Station 13. The DMA Interface 26 also processes playback commands from the User Interface function 124 in each Virtual View Station 13 and forwards these commands to the Archive Reader 103 in the Archive Computer 16, if present.

The VVS Interface Computer 29 generates Entity States for the VVS Control Center 31 and processes commands from the User Interface function 86 in the VVS Control Center. The Interface Computer 29 contains a Body State file 67, a Body Articulation function 111, a DMA Interface 26 and a VVS Controller function 81. The Body State file 67 is accessed from the shared memory and generated in real-time by the Body Propagation function 68. The Body Articulation function 111 performs the same actions as the Body Articulation function 111 in the Environment Server Computers. The DMA Interface 26 synchronizes database updates from the Body Articulation function 111 with the Entity State database 121 stored in the VVS Control Center 31. The DMA Interface 26 also process camera commands from the User Interface function 86 in the VVS Control Center 31 and forwards these commands to the VVS Controller function 81. The VVS Controller function 81 processes camera commands including Zoom, Focus and Tether commands and forwards these commands to the Camera Controller function 43 in the Camera Interface Cards 18.

The Virtual View Station 13 is responsible for rendering the video generated by the virtual camera utilizing Entity States 121 and Visual Models 122 generated by its associated Environment Server Computer 32. The VVS System 10 (in this embodiment) supports up to four virtual view stations 13. Each Virtual View Station 13 contains an Entity State file 121, a Visual Models file 122, a Scene Rendering function 126, a User Interface function 124, a Video Interface 127 and a DMA Interface 26. The Entity State file 121 stores Entity States including Entity Identification, Entity Type, Entity Position, Entity Velocity, Entity Acceleration, and state data for each Articulated Part. Each Body will contain articulated parts including two feet, two knees, two torso points, one abdomen, two shoulder points, two elbows, two hands, and one head. For each articulated part, the Articulated Part Type, Articulated Part Position, Articulated Part Orientation, Articulated Part Velocity and Articulated Part Acceleration will be scored. The Visual Models file 122 will store Visual Models including Model Name, Model Type, Entity Type Mapping, Body Dimensions, Polygonal Geometry, Textures and Texture Mapping. These databases are generated in real-time from Body State updates and Texture updates sent from the Environment Server Computer 32 through the DMA Interface 26. The Scene Rendering function 126 utilizes Entity State data 121 to position objects in a 3-dimensional scene and pre-programmed Visual Models data 122 to determine how bodies appear in the generated 3-D Scene, which represents the observer's view from a selected virtual perspective.

The Scene Rendering function 126 responds to Virtual Camera Navigation commands from the User Interface function 124 to alter the generated virtual scene as desired. The generated 3-D Scene is then sent to the Video Interface 127 for reformatting into a protocol suitable for transmission to a Video Production Center 128 and the VVS Control Center 31. In addition, the User Interface function 124 processes Virtual Camera Navigation commands and Replay Commands from the operator and forwards them to the Scene Rendering function 126 and also to the Archive Computer 16 (if present) through the DMA Interface 26. The DMA Interface acts as the communications port between the Virtual View Station 13 and its associated Environment Server Computer 32. The DMA Interface 26 also processes database updates from the Body Articulation 111 and Texture Mapping 123 functions and updates the Entity State 121 and Visual Models 113 databases appropriately. Finally, DMA Interface 26 also processes Replay Commands from the User Interface 124 and forwards them to the Archive Computer 16 through the DMA Interface 26 in the Environment Server Computer 32.

The VVS Control Center 31 may be incorporated into the VVS System 10 to monitor and tailor the operation of the Virtual View Sports System 10. The VVS Control Center 31 includes an Entity State file 121, a Plan View Display function 87, a User Interface function 86, a Video Display function 88, a Video Interface 89, and a DMA Interface 26. The Entity State file 121 stores Entity State data as previously discussed. The Plan View Display function 87 utilizes Entity State data to position objects in a 2-dimensional, top down display called a "Plan View" and which depicts a "god's eye view" of the playing arena. The Plan Display may be manipulated by a series of Plan View Entity Selection Commands received from the User Interface function 86. The Video Interface function also processes Video signals from the Virtual View Stations 13 and forwards them to the Video Display function 88. The Video Display function also responds to Video Selection Commands from the User Interface function and can display a particular Virtual View Station's Video signal based on the operator's selections. The User Interface function 86 processes Entity Identification from the Plan View Display function, generates camera Tether commands, and forwards that data to the VVS Interface Computer 29 through the DMA Interface 26. Likewise, it also processes Zoom and Focus commands from the operator and sends those commands to the VVS Interface Computer 29 through the DMA Interface 26. Video Selection commands from the operator may also be forwarded to the Video Interface function 127 in a Virtual View Station 13 in this manner.

The DMA Interface 26 acts as the communications port between the VVS Control Center 31 and the VVS Interface Computer 29. The DMA Interface 26 processes database updates from the Body Articulation function 111 and updates the Entity State database 121 appropriately. As seen in the function of other subsections, the Interface 26 It also processes camera commands including Zoom, Focus and Tether commands from the User Interface 86 and forwards them to the VVS Interface Computer 29 through the DMA Interface 26. The Video Interface 127 processes Video signals from up to four Virtual View Stations 13 and forwards them to the Video Display function 88.

While I have shown my invention in one form, it will be obvious to those skilled in the art that it is not so limited but is susceptible of various changes and modifications without departing from the spirit thereof For example, while various sub-elements in the overall system 10 have been referred to as "boards" or "sub-programs" or "subsections," each of these labels is chosen for convenience and those skilled in the industry will understand that these functions may be migrated to and from hardware, firmware, and software elements depending upon system size constraints, environmental condition requirements, and economical considerations. Re-labeling of the individual components clearly does not depart from the general spirit of the invention as presented.

REFERENCES

1. Baxes, Gregory A. *Digital Image Processing: Principles & Applications*. John Wiley & Sons, Incorporated, New York, N.Y., September.****

****Publishing date not known.

2. Castleman, Kenneth R. *Digital Image Processing*. Prentice-Hall, Paramus, N.J., August 1995.
3. Castleman, Kenneth R. *Digital Image Processing*. Prentice-Hall, Paramus, N.J., July 1979.
4. Davies, E. R. *Machine Vision: Theory, Algorithms, Practicalities*. Academic Press, Orlando, Fla., January 1990.
5. Duda, Richard C. and Hart, Peter E. *Pattern Classification & Scene Analysis*. John Wiley & Sons, Incorporated, New York, N.Y., January 1973.
6. Gonzales, Rafael C.; Wintz, Paul; Gonzales, Ralph C.; Woods, Richard E. *Digital Image Processing*. Addison Wesley Longman, Incorporated, Reading, Mass., January 1987.
7. Russ, John C. *The Image Processing Handbook*. CRC Press, Incorporated, Boca Raton, Fla., November 1994.

Having set forth the nature of the present invention, what is claimed is:

1. An apparatus for generating virtual views of sporting events, comprising:

a. an optical tracking subsection for receiving and converting video data into three dimensional positional data having a camera interface, an I/O sequence subsection, an array image processor subsection having at least one image processor, and a track correlation subsection;

b. a virtual environmental server for receiving said positional data from said optical tracking subsection and generating virtual sports figures data and virtual scene data, said environmental server having a model texturing subsection and at least one environment server computer; and, c. a least one virtual view station for rendering said virtual sports figures data and said virtual scene data from said virtual environment server into a virtual image.

2. An apparatus as recited in claim 1, further comprising an archive computer for providing real-time recording and playback of body position information and visual models, said archive computer including means for exchanging data with said optical tracking subsection and said virtual environmental server.

3. An apparatus as recited in claim 1, further comprising a control center for tailoring operation of said apparatus having a controller interface computer and a VVS control center, said control center including means for exchanging data with said virtual view station and said optical tracking subsection.

4. An apparatus as recited in claim 3, wherein said image processor includes means for identifying a three dimensional position of a selected sports player in said video data.

5. An apparatus as recited in claim 4, wherein said optical tracking subsection includes a camera controller for controlling operation of cameras supplying said video data.

6. An apparatus as recited in claim 5, wherein said I/O sequence subsection includes a gate builder for dividing up said video data into suitably sized arrays and an I/O sequencer for sequencing said sized arrays to said array image processor subsection.

7. An apparatus as recited in claim 1, wherein said image processor includes means for segmenting said video data, means for extracting a series of pre-selected features from said video data, and means for classifying said video data according to a set of preselected feature templates.

8. An apparatus as recited in claim 1 further comprising a DMA interface for storing and distributing shared memory data throughout said apparatus.

9. An apparatus as recited in claim 4, wherein said identifying means comprises means for segmenting said video data, means for extracting a series of preselected features from said data, and means for classifying said data according to a set of preselected feature templates.

10. An apparatus for generating virtual views of sporting events, comprising:
    a. means for receiving and converting video data into three dimensional positional data;
    b. means for receiving said positional data from said receiving and converting means and generating virtual sports figures data and virtual scene data; and,
    c. means for rendering said virtual sports figures data and said virtual scene data from said virtual environment server into a virtual image.

11. An apparatus as recited in claim 10 wherein said means for receiving and converting video data comprises a camera interface, an I/O sequence subsection, an array image processor subsection having at least one image processor, and a track correlation subsection.

12. An apparatus as recited in claim 11 wherein said means for receiving and generating comprises a model texturing subsection for generating three dimension models and textures, and an environmental server computer for providing body position information and visual models to said virtual view station.

13. An apparatus as recited in claim 10 further comprising means for providing real-time recording and playback of said virtual sports figures data and said virtual scene data.

14. An apparatus as recited in claim 10 further comprising means for tailoring operation of said apparatus including a controller interface computer and a VVS control center, said control center including means for exchanging data with said rendering means and said receiving and converting means.

15. A method for generating virtual views of a sporting event, comprising the steps of:
    a. receiving video data from cameras positioned around said sporting event;
    b. converting said video data into three dimensional positional data of each sporting participant appearing in said video data;
    c. generating three dimensional models from said positional data for said participants; and,
    d. combining coherent body position information with said three dimensional models to render a virtual scene.

16. A method as recited in claim 15 wherein said converting step comprises the steps of:
    a. partitioning said video data into a plurality of gates;
    b. sequencing said gates to a plurality of array processors for image processing; and,
    c. identifying objects in said video data through segmentation, feature extraction, and object classification.

17. A method as recited in claim 16 wherein said generating step comprises the steps of:
    a. creating a three dimensional wire-frame representation of each said sporting participant appearing in said video data, said wire-frame including body parts for each said participant; and,
    b. generating model textures for each said body part on said wire-frame representation and mapping said textures onto each said body part.

18. A method as recited in claim 17 including the additional steps of creating coherent body position information from said model textures and said positional data prior to said rendering step.

19. A method as recited in claim 15 including the additional step of controlling said cameras' position, tether, focus, and zoom to provide video data from a desired location in said sporting event.

20. A method as recited in claim 16 including the additional step of recording said three dimensional position data for playback at a later time.

* * * * *